United States Patent
Sullivan (10) Patent No.: US 6,901,477 B2
(45) Date of Patent: May 31, 2005

(54) PROVISION OF A VICTIM CACHE WITHIN A STORAGE CACHE HIERARCHY

(75) Inventor: Douglas Sullivan, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 286 days.

(21) Appl. No.: 10/113,249

(22) Filed: Apr. 1, 2002

(65) Prior Publication Data
US 2003/0188104 A1 Oct. 2, 2003

(51) Int. Cl.$^7$ ............................................. G06F 12/00
(52) U.S. Cl. ...................................... 711/113; 711/135
(58) Field of Search ................................. 711/113, 135

(56) References Cited

U.S. PATENT DOCUMENTS 5,822,755 A * 10/1998 Shippy ....................... 711/118

* cited by examiner

*Primary Examiner*—Kevin Verbrugge
(74) *Attorney, Agent, or Firm*—Steubing McGuiness & Manaras LLP (57) ABSTRACT

Apparatus, methods, and program products for storing data address a first cache and a second cache. The second cache is capable of operating in a first mode wherein data read for storage in the first cache is also stored in the second cache, and is capable of operating in a second mode wherein the data stored in the second cache does not include at least some of the data read for storage in the first cache. The data stored in the second cache includes data that has been removed from the first cache. Thus the contents of the second cache are at least partially exclusive of the contents of the first cache. The described apparatus, methods, and program products are advantageously employed in multi-level caching systems wherein the caches may be approximately the same size.

24 Claims, 9 Drawing Sheets

PROVISION OF A VICTIM CACHE WITHIN A STORAGE CACHE HIERARCHY

FIELD OF THE INVENTION

The present invention relates generally to caches, and more particularly to techniques for maximizing the efficiency of multi-level caches.

BACKGROUND OF THE INVENTION

Today's communications systems include many elements such as servers, desktop computers, storage devices, and network systems, all of which include processors and memory. The speeds at which these processors operate have greatly increased as these systems have evolved. Processor speeds have generally increased faster than the speeds of memory devices, for instance dynamic random access memories, that are typically used to implement main memory systems.

One known way to improve the performance of a system including a fast processor and slower main memory is to employ a cache memory between the processor and the main memory. The cache memory is relatively small as compared to the main memory, and is typically constructed of high speed memory devices that are more expensive than the devices used to implement the main memory. Processor accesses to the main memory are stored in the cache. The purpose of the cache is to provide the processor access to high speed memory during a majority of the processor's memory accesses. The processor tends to find the data it needs in the cache because of the principle of "locality of reference", wherein the processor tends to utilize relatively close memory addresses during a given period of time.

The concept of caching has been extended to storage systems. Large storage systems of today can include many gigabytes of data stored on fixed media such as hard disk drives or optical drives. Access to the data on such drives is slower than access to memory devices such as dynamic random access memory. Therefore, some large storage systems contain memory for caching disk data, so that recently accessed disk data can be returned more quickly. The performance of the storage system is thus enhanced.

As system performance requirements increase, caches become more prevalent. It is now likely that a computer system, such as a database server, will contain a cache for caching I/O operations. It is also likely that such a computer system is coupled with another system, such as a storage system, that also contains a cache. It would be desirable to maximize the efficiency of the caching operations in such systems.

SUMMARY OF THE INVENTION

In accordance with the principles of the current invention, there is provided apparatus for storing data comprising a first cache and a second cache, wherein the second cache is capable of operating in a first mode wherein data read for storage in the first cache is also stored in the second cache, and is capable of operating in a second mode wherein the data stored in the second cache does not include at least some of the data read for storage in the first cache. Thus the contents of the second cache are at least partially exclusive of the contents of the first cache, resulting in performance enhancements. In accordance with an embodiment of the invention, the data stored in the second cache includes data that has been removed from the first cache. The first cache can conveniently reside in a computer system while the second cache resides in a storage system.

According to another embodiment of the invention, there is provided apparatus for storing data including a first system having a first controller and a first cache for storing data, and a second system comprising a data storage apparatus (for example a disk array), a second controller, and a second cache for storing data. The first controller is operable to control the contents of the first cache and to issue commands to the second controller. The second controller is responsive to the commands issued by the first controller and is operable to control the contents of the second cache and the data storage apparatus. The first controller is capable of causing data to be removed from the first cache and issuing a command to the second controller indicating that the removed data should be stored in the second cache, and the second controller is responsive to the command to cause the removed data to be stored in the second cache.

The first command may include the removed data, or may include the address of the removed data, in which case the second controller causes the contents of the data storage apparatus at the address included in the command to be read and then stored in the second cache.

The first controller can be operable to issue a command to the second controller indicating that the second controller should not cause data to be stored in the second cache in response to read request commands issued from the first controller. Also, the first controller can be operable to issue a read request command to the second controller, the read request command indicating that the second controller should not cause data to be stored in the second cache in response to the read request command.

The first controller can be operable to issue a write request command to the second controller, the write request command indicating to the second controller that data should be written to the second cache and to the data storage apparatus. The first controller can also be operable to issue a write request command to the second controller, the write request command indicating to the second controller that data should be written to the data storage apparatus but not to the second cache.

According to a further embodiment, the first system further includes a write buffer for storing data that is being removed from the first cache. The first controller is operable to issue a write request command to the second controller, the write request command indicating to the second controller that the removed data should be stored in the second cache, stored in the data storage apparatus, and then released from the second cache after the data has been stored in the data storage apparatus.

Further aspects of the invention are directed to similar methods and computer program products. The various aspects of the invention are advantageously employed in a multi-level caching system where it may be performance enhancing to provide data exclusivity between the caches.

DETAILED DESCRIPTION OF EXEMPLARY EMBODIMENTS

Figure 1:
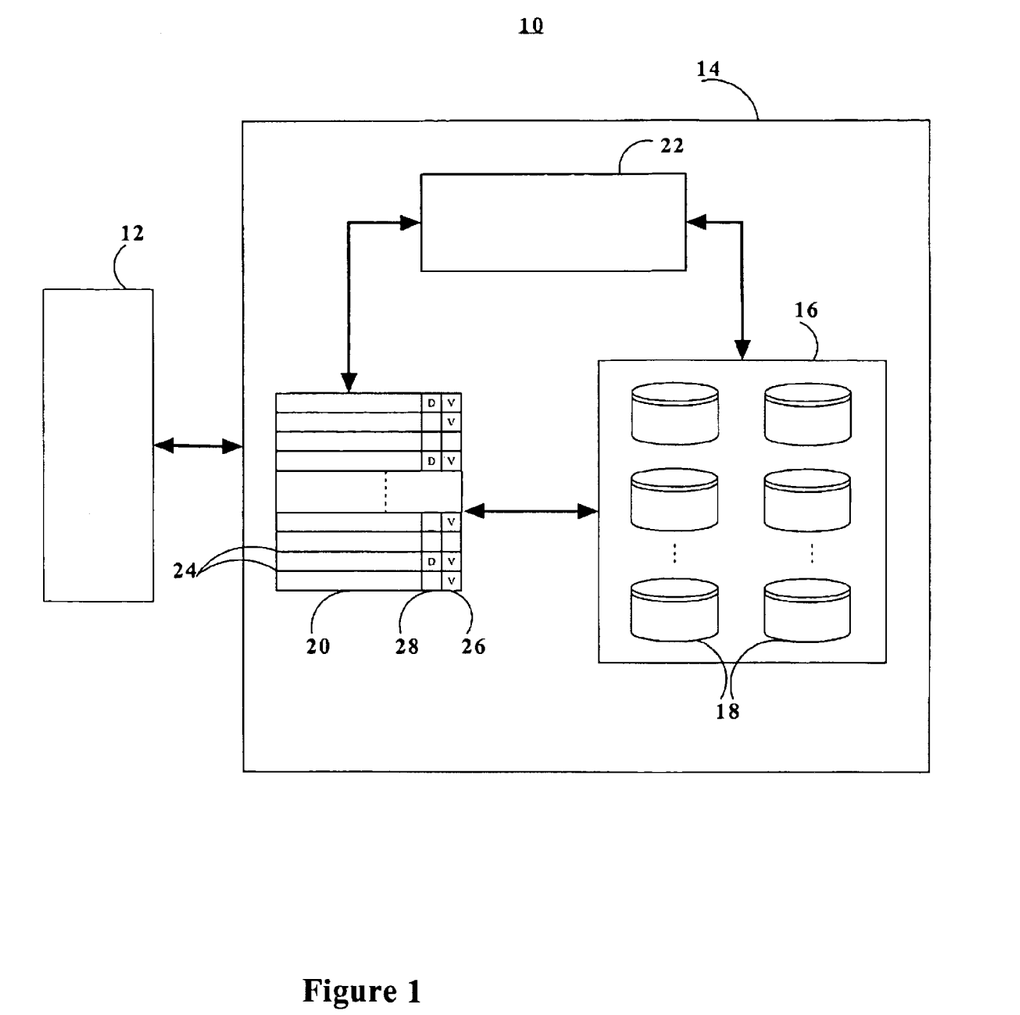
FIG. 1 is a schematic representation of a computing system including a host system and a storage system.

In FIG. 1 there is shown a computing system 10 including a host system 12 and a storage system 14. The storage system 14 includes a disk array 16 made up of banks of disk drives 18. The disk array 16 is in communication with a disk cache 20. A controller 22 is coupled to the disk array 16 and the disk cache 20. The disk cache 20 consists of memory, such as dynamic random access memory. Data can be accessed more quickly from the higher speed disk cache 20 than from the disk array 16. The capacity of the cache memory is generally much smaller than the capacity of the disk array. For example, the disk array may be capable of storing many gigabytes of data, whereas the cache may be capable of storing 512 megabytes of data The disk cache 20 is employed to store data read from the disk array 16 so that subsequent accesses to the same data can be returned more quickly.

The disk cache 20 generally operates as follows. When the host system 12 needs to read data from the storage system 14, the host server sends a read request command to the storage system 14. The controller 22 responds to the read request by first checking the disk cache 20 to see if the requested data resides in the disk cache 20. If it does, the read access is referred to as a "hit" and the data is returned from the disk cache 20 to the host system 12. If the requested data does not reside in the disk cache 20, the read access is referred to as a "miss". The controller 22 will then retrieve the requested data from the disk array 16, cause it to be returned to the host system 12, and cause it to be stored in the disk cache 20. The disk cache 20 includes locations 24 for storing blocks of data as they are read from the disk array 16. As a location 24 is filled with data, the controller 22 sets a valid bit 26 for the location.

Eventually the disk cache 20 will become full of valid data. In this case, if the host system 12 requests data that does not reside in the disk cache 20, or in other words the access is a "miss", then the controller 22 will retrieve the requested data from the disk array 16 and cause it to be returned to the host system 12, and will cause a location 24 in the disk cache 20 to be over-written with the requested data. The data that has been removed from the location in the disk cache 20 is referred to as having been "evicted" and the discarded data is referred to as "victim" data. Any number of known algorithms can be used by the controller 22 to select which cache location should be evicted. For example, the controller may evict data from the location that was least recently used (LRU), or the controller may evict data on a first-in-first-out basis (FIFO), or by random replacement.

Data writes by the host system 12 to the storage system 14 can be handled according to a number of known different caching architectures. According to one caching architecture known as "write-through", the controller 22 responds to a write request command from the host system 12 by writing the data to both the disk cache 20 and the disk drives. If a host server write causes a "hit" in the disk cache 20, in other words the host server is attempting to write to a disk array location whose contents exist in the disk cache 20, then the data residing at the disk cache location is evicted and the new data is written to both the cache and the disk drives. According to the write-through architecture, the contents of the cache are always exactly the same as the contents of the disk array 16 locations cached.

According to another caching architecture known as "write-back", the controller 22 responds to a write request command from the host system 12 by writing the data to the disk cache 20 only—not to the disk array 16. The location in the disk cache 20 to which the data was written is marked with a "dirty" bit 28. The dirty bit 28 indicates that the data stored in the cache location is not the same as the data stored in the corresponding disk array 16 location. Thus, before the controller 22 can evict dirty data from a cache location so that the location can be used by another block of data, the victim data must be written back to the disk array 16. The write-back architecture is generally higher in performance than the write through architecture due to the fact that fewer writes occur to the disk array. The write-back architecture is preferably employed by the host system 12 and the storage system 14.

Figure 2:
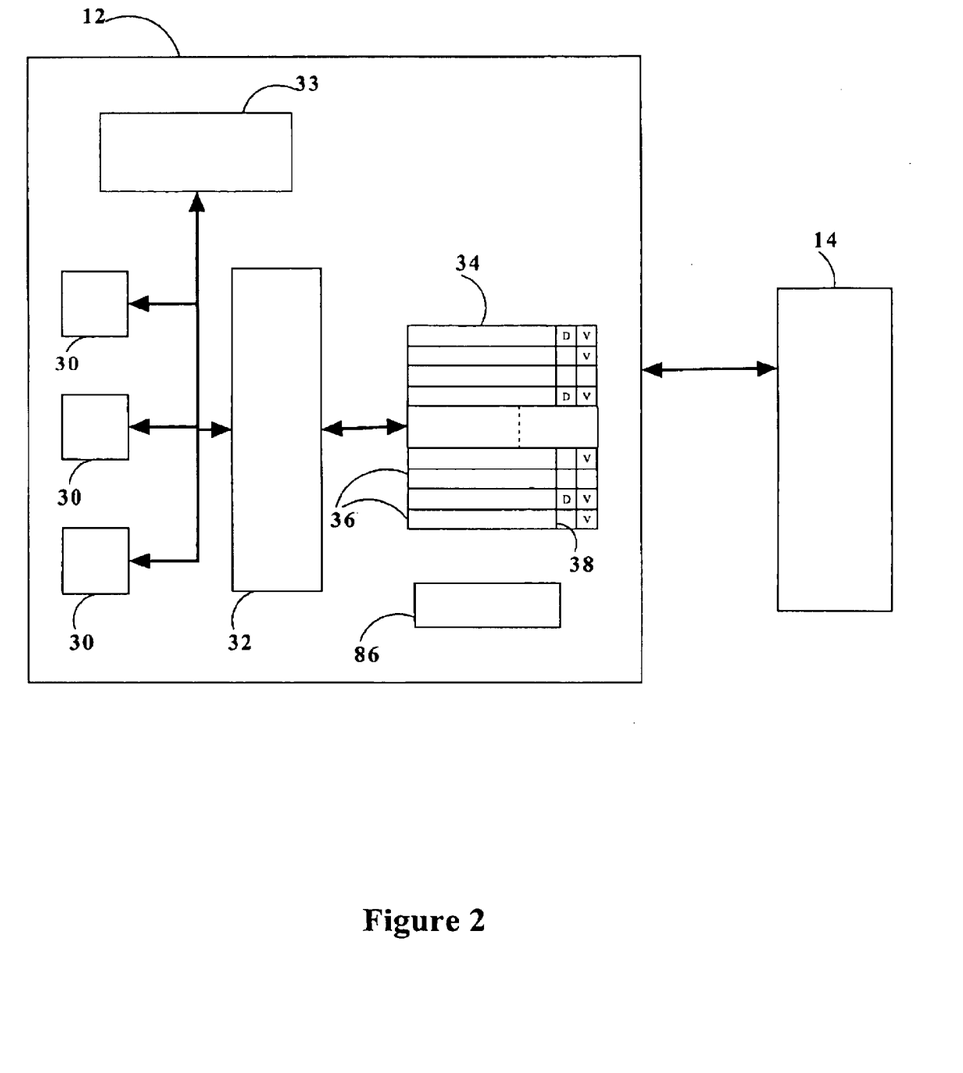
FIG. 2 is a schematic representation of the host system of FIG. 1.

Referring now to FIG. 2, the host system 12 is shown in more detail. The host system 12 includes at least one processing unit 30, an I/O subsystem 32, a main memory 33, and a host cache 34. The elements comprising the host system 12 may be separate systems themselves, or may be housed within a single unit. The host system 12 accesses information stored on the storage system 14 via its I/O subsystem 32. The host cache 34 consists of memory for storing data retrieved from the storage system 14 so that subsequent accesses to the same data can be performed relatively quickly. That is, if a processing unit 30 requests data from the storage system 14 that already exists in the host cache 34, that data can be retrieved directly from the host cache 34 without any need for an access to the storage system 14, thus increasing performance. The host cache 34 operates in a similar manner as was previously described with regard to the disk cache 20.

The host cache 34 and disk cache 20 thus form a multi-level cache. If the host system 12 needs to read data from the storage system 14, the I/O subsystem 32 will check to see if the requested data resides in the host cache 34. If it does, the data is returned to the requesting processor unit 30. If it does not, then the I/O subsystem 32 performs a read request to the storage system 14. The data is returned from the storage system 14, and the I/O subsystem 32 forwards the data to the requesting processor 30 and stores the data in the host cache 34. Meanwhile, the controller 22 of the storage system 14 responded to the read request by checking to see if the requested data resided in the disk cache 20. If it did, the data was returned from the disk cache 20 to the host system 12, where it was stored in the host cache 34. If it did not, the controller caused the data to be read from the disk array 16 and returned to the host system 12, and caused the data to be stored in the disk cache 20. Data writes from a processor unit 30 are written to the host cache 34 and the dirty bit 38 for the location written is set. When a host cache 34 location containing dirty data needs to be evicted, the dirty data is written back to the storage system 14, wherein the dirty data is written to the disk cache 20 and, if the disk cache location 20 was also dirty, to the disk array 16.

According to this multi-level caching scheme, the host cache 34 can be considered a level 1 cache, and the disk cache 20 can be considered a level 2 cache. As so far described, this is an inclusive multi-level caching scheme—that is, all data stored in the host cache 34 is also stored in the disk cache 20. If, as is the case in known multi-level caching schemes, the host cache 34 is much smaller than the disk cache 20, then a given read request performed by a processor unit 30 may result in a miss in the level 1 cache, but a hit in the larger level 2 cache. Thus the disk cache 20 provides significant performance gains.

However, some host systems of today are extremely large. The host system 12 shown herein could be for example a very large database cluster. Such clusters can contain very large host caches 34. Some such host caches 34 can be as large as or larger than the disk cache 20. In this case, the inclusive multi-level caching scheme so far described loses its advantages, because both caches contain the same data. In other words, if the disk cache 20 is not larger than the host cache 34, the only data that will reside in the disk cache 20 is data that already resides in the host cache 34. Therefore, if a read request from a processor unit 30 misses in the host cache 34, it will also miss in the disk cache 20. The disk cache 20 therefore provides no further performance gain.

In such a configuration wherein the host cache 34 approaches the size of the disk cache 20, certain changes to the semantics that operate the disk cache 20 can return new performance gains in accordance with the principles of the invention. Special commands are built into the protocol communicating between the host system 12 and the storage system 14 such that unique data is stored in each cache and the contents of the disk cache 20 is no longer entirely inclusive of the contents of the host cache 34. The following mechanisms advantageously provide a multi-level caching system wherein the second level cache can optionally be used in a manner such that it contents are substantially non-inclusive of the contents of the first level cache, thus increasing the probability of a hit in the second level cache. According to the preferred embodiment of the invention herein described, this is accomplished by utilizing the second level cache, i.e. the disk cache 20, to store victim data from the first level cache, i.e. the host cache 34.

Figure 3A:
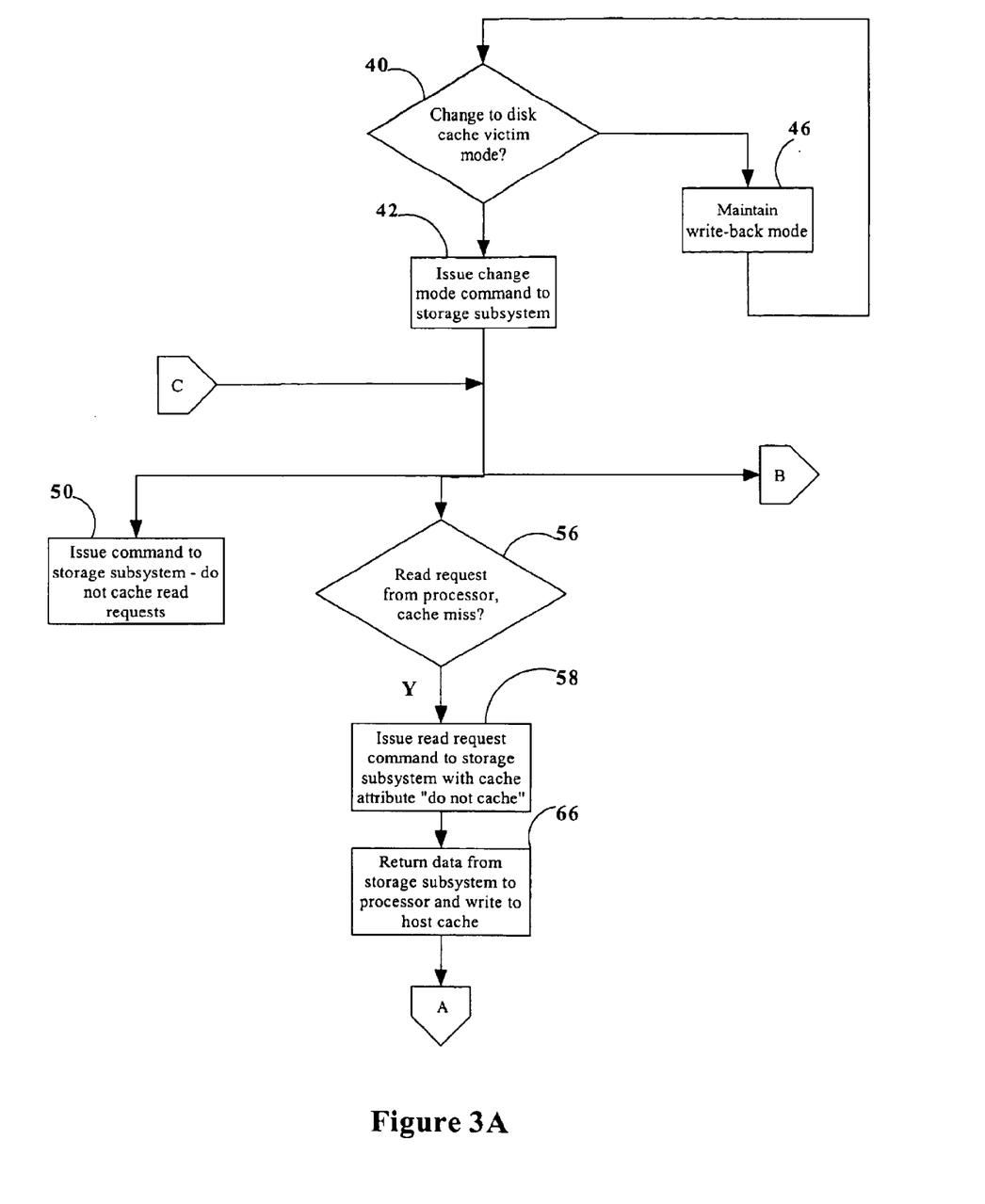
FIG. 3 is a flow diagram showing the operation of the I/O subsystem of FIG. 2.
Figure 3B:
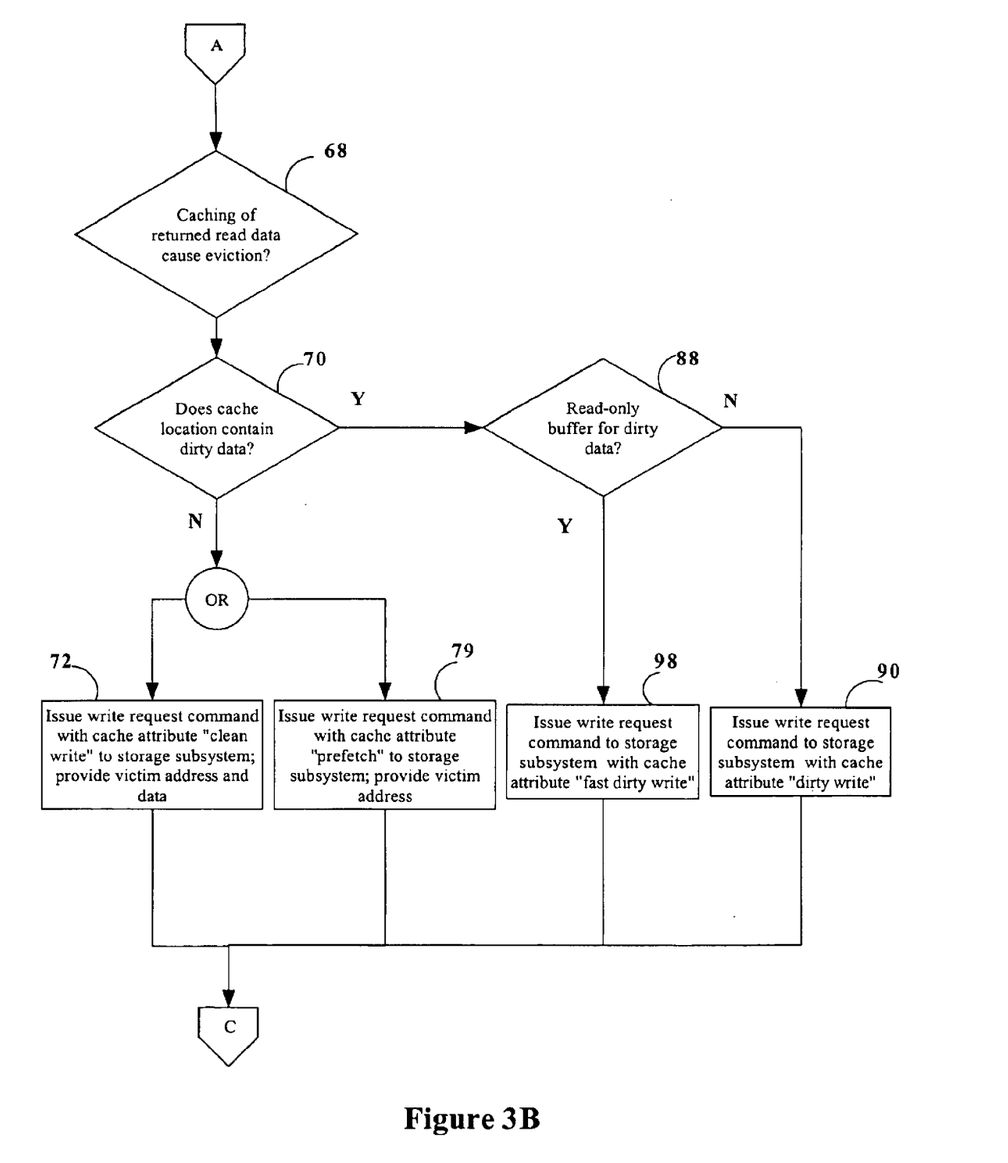
Figure 3C:
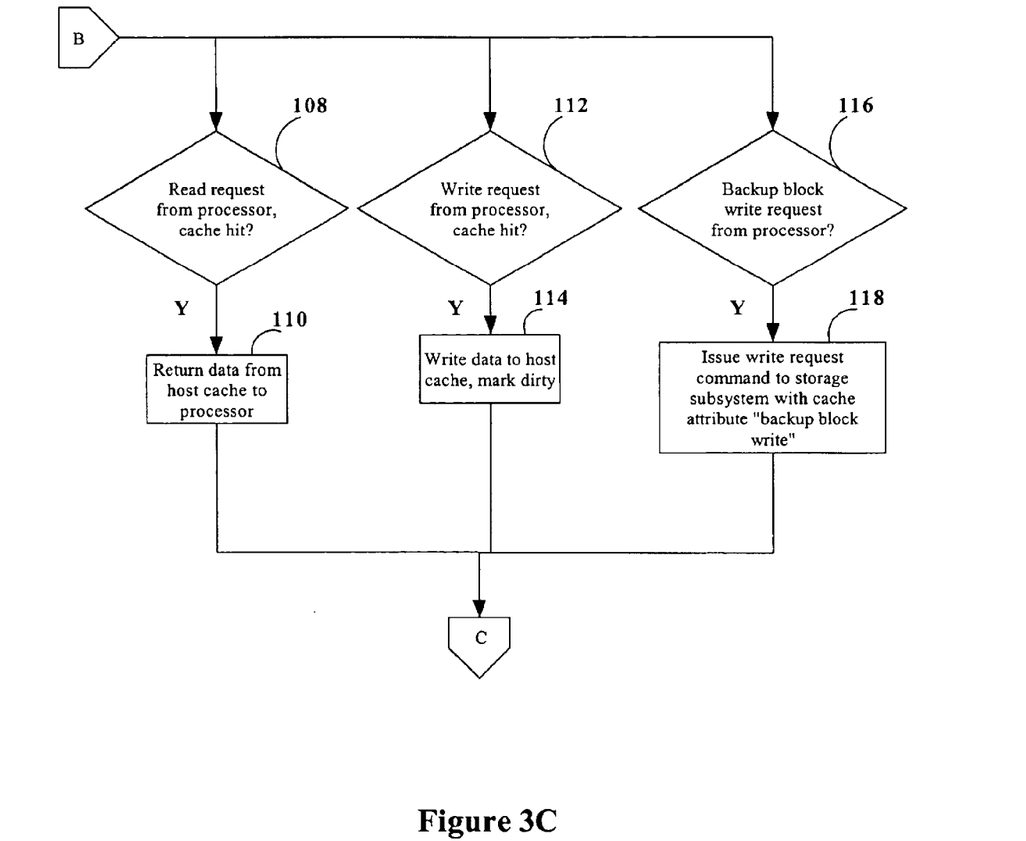
Figure 4A:
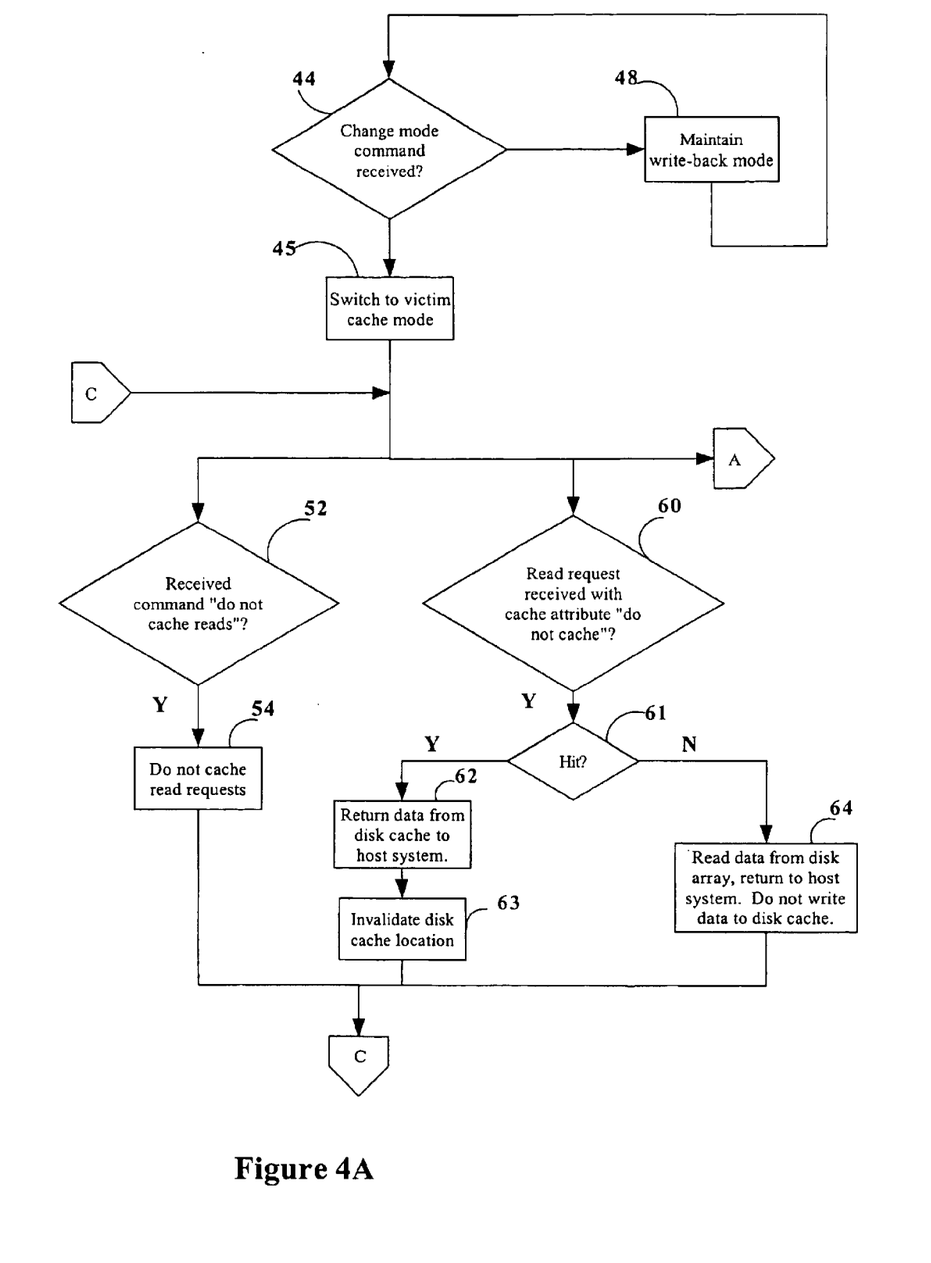
FIG. 4 is a flow diagram showing the operation of the controller of FIG. 1.
Figure 4B:
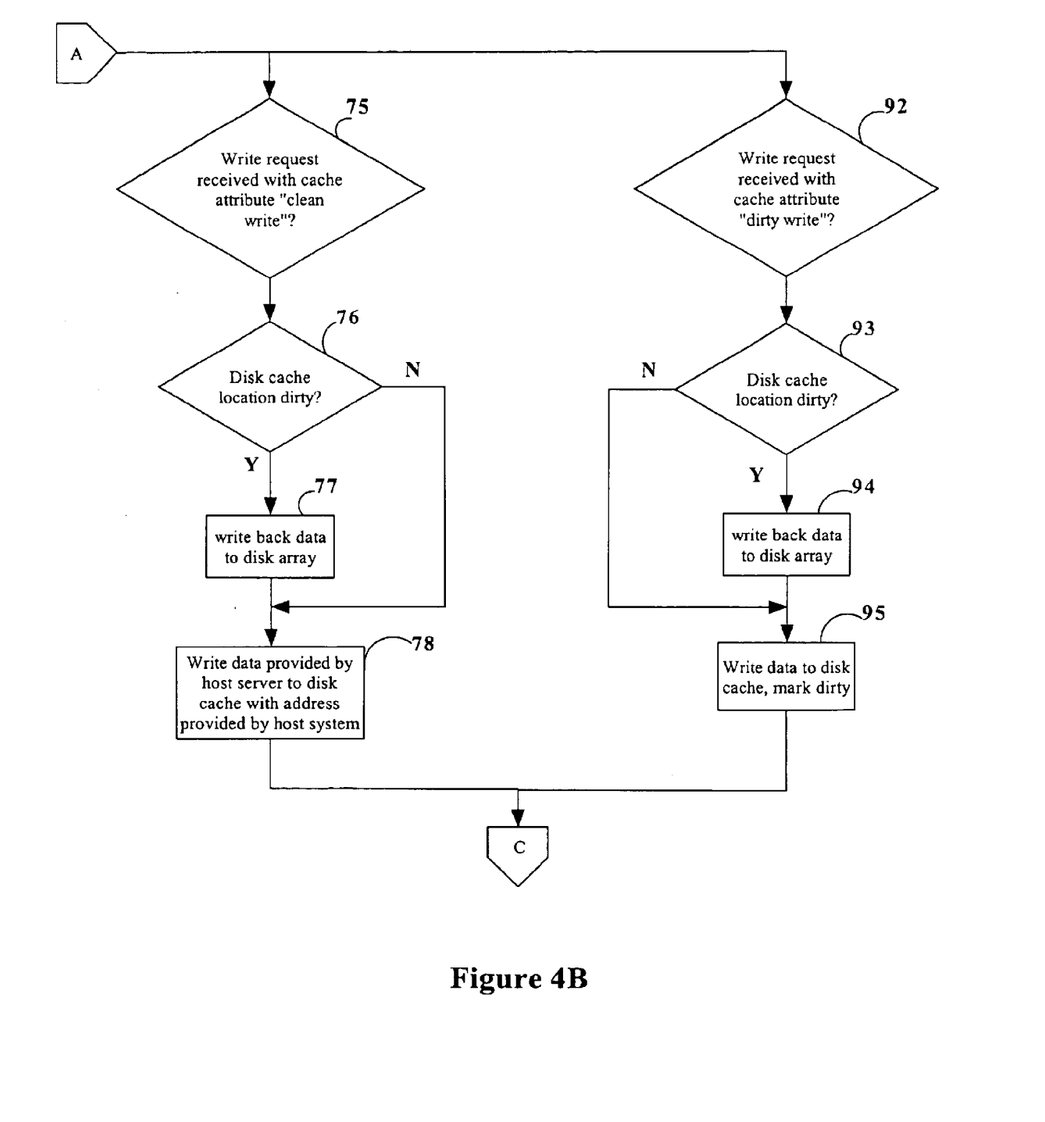
Figure 4C:
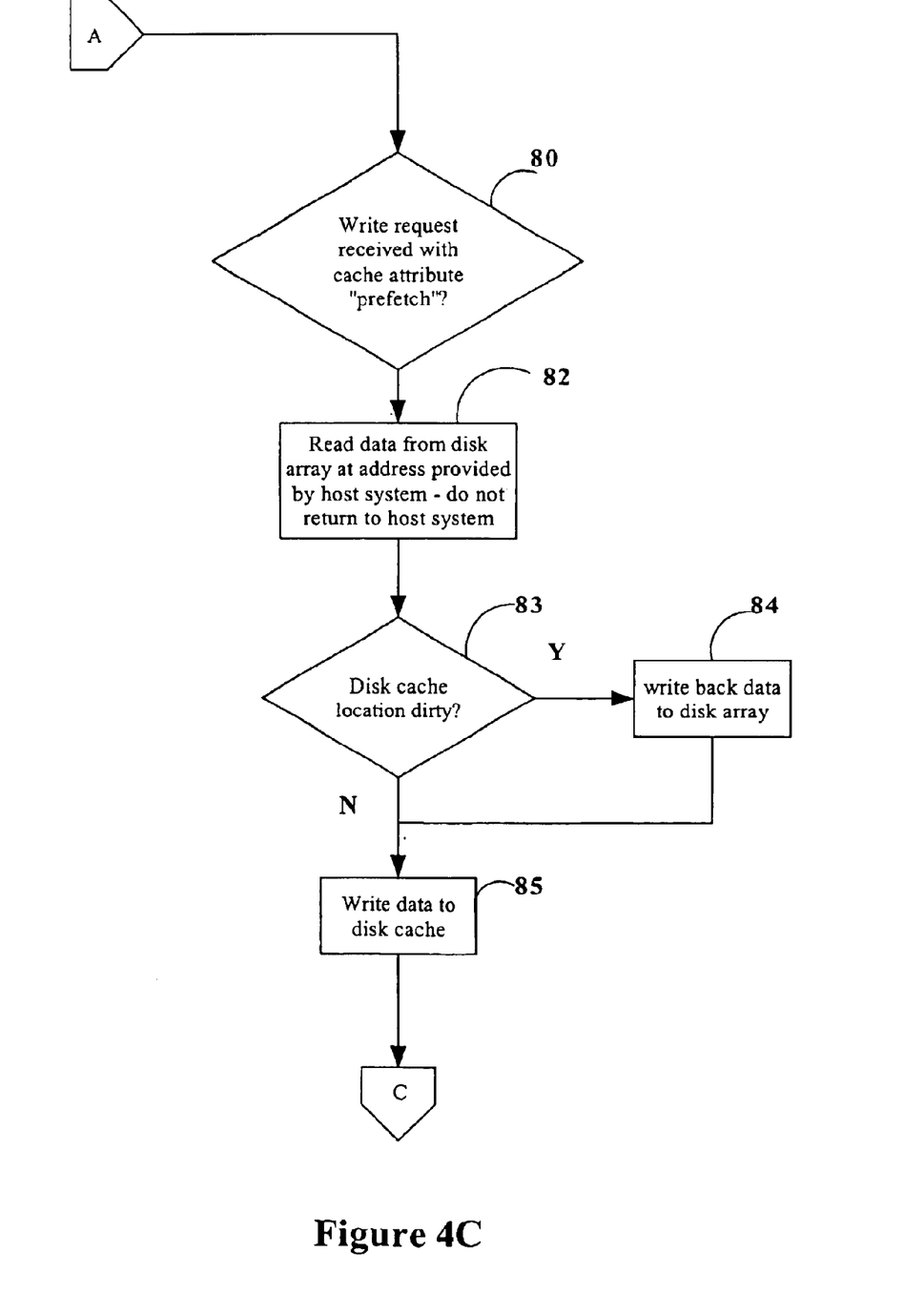
Figure 4D:
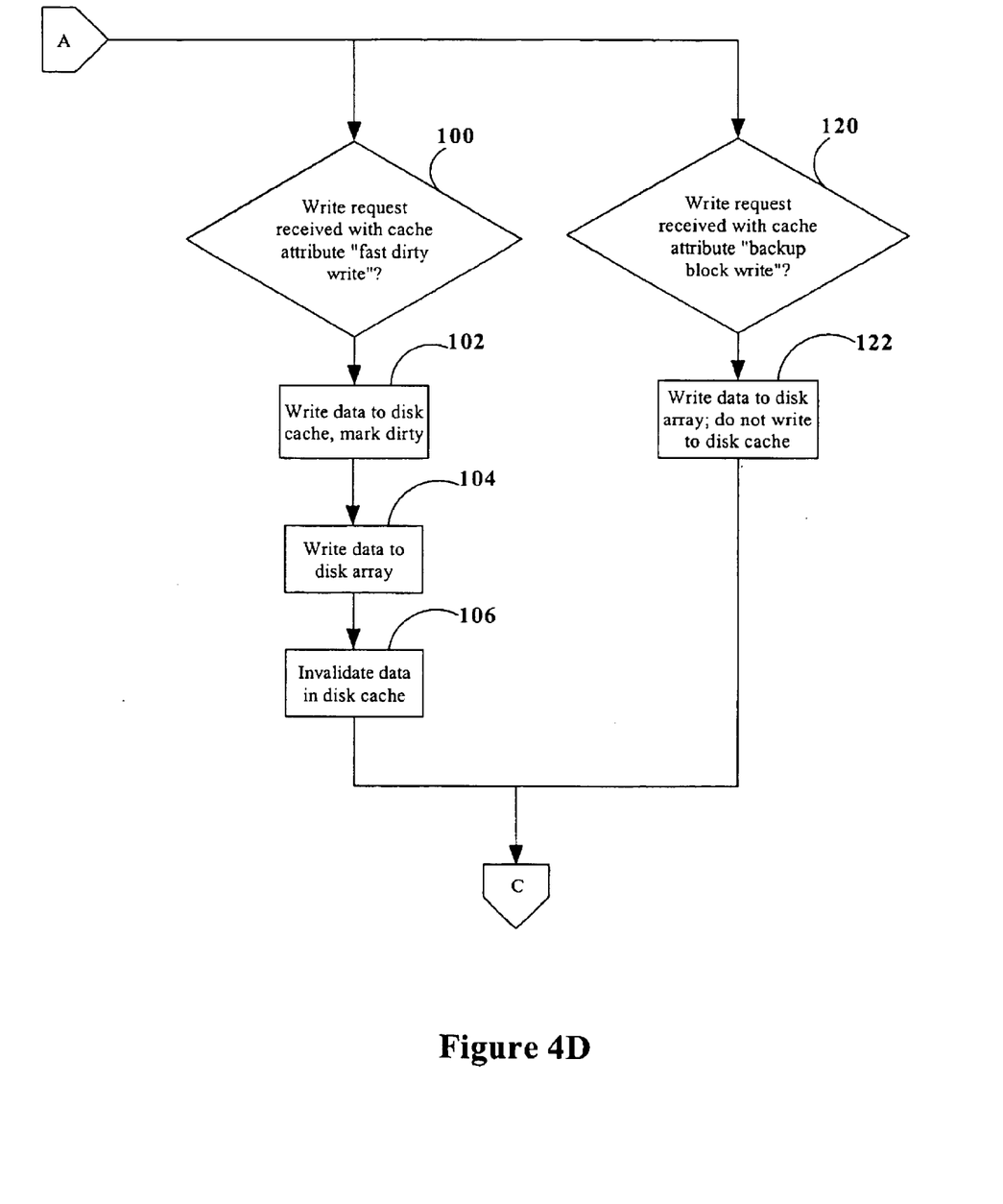

In the embodiment shown, the I/O subsystem 32 in the host system 12 controls the host cache 34, and the controller 22 in the storage system 14 controls the disk cache 20 and the disk array 16. FIG. 3 shows the operation of the I/O subsystem 32 and FIG. 4 shows the operation of the controller 22 in accordance with the invention. First of all, the host system 12 can decide that the disk cache 20 should be used in a different manner in order to increase performance (FIG. 3 step 40). If such a decision is made, the I/O subsystem 32 issues a "change mode" command to the storage system 14 (FIG. 3 step 42). The controller 22 receives the command (FIG. 4 step 44) and understands that the disk cache 20 should be used in a different mode, herein referred to as "victim mode" (FIG. 4 step 45). This communication updates the controller 22 to change the manner in which the disk cache 20 is utilized. If the host system 12 does not issue the change mode command, both the I/O subsystem 32 and controller 22 continue to maintain their respective caches in write-back mode (FIG. 3 step 46, FIG. 4 step 48.).

Now operating in victim mode, the I/O subsystem 32 may issue a command to the storage system 14 that indicates that the disk cache 20 should no longer cache read requests that are performed as a result of a miss in the host cache 34, regardless of whether the request is a hit or miss in the disk cache 20 (FIG. 3 step 50). The controller 22 receives this command (FIG. 4 step 52) and updates its logic such that read requests issued by the host system 12 will not be cached (FIG. 4 step 54). This prevents replication of data in the host cache 34 and the disk cache 20—that is, newly accessed data is cached only in the host cache 34.

Alternatively, the I/O subsystem may attach a special cache attribute to each read command that is issued to the storage system 14. In FIG. 3 step 56, if the I/O subsystem receives a read request from a processor 30 that results in a host cache 34 miss, the I/O subsystem issues a read request command to the storage system 14 containing a cache attribute that indicates that this read request should no be cached (FIG. 3 step 58). The controller 22 receives this command (FIG. 4 step 60) and responds by checking to see if the requested data is resident in the disk cache 20 (FIG. 4 step 61). If the request is a hit, the data is returned from the disk cache 20 to the host system 12 (FIG. 4 step 62), and the disk cache 20 location that was hit is invalidated (FIG. 4 step 63). The disk cache 20 location is invalidated in order to maintain the substantial exclusivity of data between the caches. The disk cache 20 location can now be used to store victim data, as will be explained. If the request is a miss, then the controller 22 causes the requested data to be read from the disk array 16 and returned to the host system 12. The controller does not store the data in the disk cache (FIG. 4 step 64). The I/O subsystem 32 causes the returned data to be forwarded to the requesting processor, and causes the data to be stored in the host cache 34 (FIG. 3 step 66). Note that in the I/O subsystem process depicted in FIG. 3, the read request issued at step 58 need not contain the "do not cache" attribute if the general command was issued at step 50.

The host cache miss in the host system 12 that resulted in the read request to the storage system 14 may result in an eviction from the host cache 34. For instance, if the host cache 34 was full of valid data, then the I/O subsystem 32 must evict data from a host cache line 36 in order to store the data just received in the host cache 34. If the caching of the returned read data causes an eviction (FIG. 3 step 68), then the I/O subsystem determines whether the data being evicted is dirty data (FIG. 3 step 70). If the data is not dirty, the I/O subsystem can issue several different commands to the storage system 14.

The I/O subsystem may issue a write request command containing a "clean write" cache attribute to the storage system 14. With this command, the victim address and data are provided (FIG. 3 step 72). The controller 22 receives this command (FIG. 4 step 75) and, in response, proceeds to write the victim data provided with the command to the disk cache. The controller 22 first checks to see if the cache location to which the data is to be written is marked dirty (FIG. 4 step 76), and if so, writes the data back to the disk array 16 (FIG. 4 step 77). The data is then written to the disk cache 20 (FIG. 4 step 78). The disk cache 20 location is not marked dirty in response to this write request.

Alternatively, the I/O subsystem may issue a write request command containing a "prefetch" cache attribute to the storage system 14 (FIG. 3 step 79). The victim disk array address is provided with this command. The controller 22 receives this command (FIG. 4 step 80) and, in response, proceeds to read the victim data from the disk array 16 at the address provided with the command (FIG. 4 step 82). The controller 22 checks to see if the disk cache location to which the data is to be stored is dirty (FIG. 4 step 83). If so, the data at that location is written back to the disk array (FIG. 4 step 84). The controller 22 then writes the data to the disk cache 20 (FIG. 4 step 85). The disk cache 20 location is not marked dirty in response to this write request.

Since the victim data written to the disk cache 20 was recently used by the host system 12, it is likely that it will be used again. The disk cache 20 will eventually fill with victim data from the host system 12. If the host system 12 does subsequently request any of the victim data, the request will miss in the host cache 34 but will hit in the disk cache 20. The contents of the host cache 34 and disk cache 20 are now substantially exclusive, and thus the disk cache 20 is now providing system performance gains, even though the disk cache 20 is not significantly larger (and may be smaller) than the host cache 34.

As previously described, when a host cache 34 location containing dirty data is evicted, all other caches and the disk drives are written with the contents of the dirty host cache location 36 when the host cache 34 is updated with new data, in order to maintain coherency between the memory subsystems. Thus, when the host system 12 needs to evict a dirty cache location, the contents of that cache location must be written to the disk cache 20 and possibly the disk array 16 in the conventional manner. The write-back of the dirty data can take some time. Some host servers therefore employ a write buffer that stores the evicted dirty data, in case it is needed prior to the time at which the dirty data has been written back to the disk array 16. FIG. 2 shows that the host system 12 employs such a buffer 86.

Referring back to FIG. 3, if the cache location being evicted does contain dirty data (FIG. 3 step 70), then, if there is no write buffer for storing the evicted data (FIG. 3 step 88), a write request containing a cache attribute "dirty write" is issued to the storage system 14 in the standard manner (FIG. 3 step 90). The controller 22 receives this command (FIG. 4 step 92) and responds by writing the dirty data to the disk cache 20. The controller first checks to see if the disk cache location being written is dirty, and if so, writes the data back to the disk array (FIG. 4 steps 93 and 94). The dirty data is written to the disk array and the location is marked dirty (FIG. 4 step 95).

If the host system 12 does contain a write buffer for storing dirty data (FIG. 3 step 88), then the I/O subsystem issues a write request command containing a cache attribute "fast dirty write" to the storage system 14 (FIG. 3 step 98). The controller 22 receives this command (FIG. 4 step 100) and proceeds to write the dirty data to the disk cache and to the disk array (FIG. 4 steps 102 and 104). After the data has been written to the disk array, the controller 22 invalidates the cache location at which the dirty data was just written (FIG. 4 step 106). Thus, the disk cache 20 only stores the dirty data until it has been written to the disk array 16. This releases the disk cache location 24 and makes it available for storing victim data, further increasing performance.

Referring back to FIG. 3, if the I/O subsystem receives a read request from a processor 30 that results in a host cache hit (FIG. 3 step 108), the data is returned from the host cache 34 to the processor 30 in the conventional manner (FIG. 3 step 110). If the I/O subsystem receives a write request from a processor (FIG. 3 step 112), the data is written to the host cache 34 and the cache location is marked dirty in the conventional manner (FIG. 3 step 114.)

Some host systems, such as large database clusters, store very large blocks of data in their main memory systems 33. As a security measure, such hosts systems may periodically halt memory access activity and write the entire contents of portions of their main memory 33 out to the storage system 14—herein referred to as a "backup block write". Thus, if any problem occurs that would affect the contents of the main memory 33 or affect the host system's ability to access the contents of the main memory 33, a recently backed up copy of the contents of the main memory 33 can be retrieved from the storage system 14. These periodic backup block writes of large blocks of data are performed in a write-through manner (i.e. the host cache 34 and disk array 16 are both updated). Most of this data will be "clean" data. Therefore, when the disk cache 20 is operating in victim mode, there is no need to cache this backup block write data. This further aids in maintaining exclusivity between the data stored in the host cache 34 and data stored in the disk cache 20.

Referring to FIG. 3, when the I/O subsystem receives a request for a backup block write (FIG. 3 step 116), it issues a write request command containing a cache attribute "backup block write" to the storage system 14 (FIG. 3 step 118). The controller 22 receives this command (FIG. 4 step 120) and responds by causing the backup data to be written to the disk array 16 but not to the disk cache 20 (FIG. 4 step 122.) If per chance any of the data being written hits a dirty location in the host cache 34, a dirty write request will be issued and the controller 22 will proceed from steps 92 or 100.

Note that the invention is applicable where other caching architectures are employed. For example, in a write-through cache, victim data resulting from a read miss in the host cache 34 will still be stored in the disk cache 34. However, write hits to the host cache 34 will be passed to the storage subsystem 14. The write request passed to the storage system 14 will most likely result in a miss in the disk cache 20, since the disk cache 34 is not storing data in response to read requests, and is storing victim data from the host cache 34. The write request would thus result in a write to the disk array 16.

In accordance with a write-through scheme, the dirty data check would not be performed at step 70 of FIG. 3. One of steps 72 or 79 would be performed when data is evicted from the host cache 34. Steps 88, 90, and 98 of FIG. 3 would not be needed. At step 114, data would be written to the host cache 34 in response to a write request from a processor 30 that hits the cache 34, but no dirty bit would be set. The write request would be forwarded to the storage system 14 as well. If the disk cache 20 is also a write-through cache, then steps 76 and 77 of FIG. 4 are unnecessary. "Clean write" requests (i.e. write requests that result from an eviction from the host cache 34) would continue to be written to the disk cache but not to the disk array, as shown in step 78. Other write requests would result in a write to the disk array 16 and possibly to the disk cache 20 in the unlikely event of a hit in the disk cache 20. (This may occur where a read miss in the host cache 34 results in a hit in the disk cache 20, and is followed by a write to the host cache 34 location that was just updated.)

Alternatively, when a read request from the host system 12 causes a hit in the disk cache 20, the controller 22 could choose to invalidate the disk cache 20 location hit after the contents of that location have been returned to the host cache 34. This would further help to keep the contents of the two caches exclusive, would eliminate the chance of a write hit in the disk cache 20, and would free the location for storage of further victim data.

The invention is also applicable in a write-allocate caching architecture. According to this architecture, write requests result in a cache location allocation for the write data. However, an implementation wherein the disk cache 20 operates according to a write allocate scheme may decrease the effectiveness of the inventive scheme, as this will result in data duplication between the host and disk caches.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, though the invention has been described in the context of a storage system, it will be apparent to the skilled artisan that the invention is applicable in any multi-level caching system. It is applicable in systems including data storage apparatus other than a disk array, for example a dynamic random access memory. Even where a second level cache is much larger than a first level cache, it may be useful to provide a second level cache that is either inclusive or exclusive of the contents of the first level cache depending upon the application. The skilled artisan will realize that, though as herein described the second level cache caches victim data which is exclusive of the first level cache, other types of data might be cached which are exclusive of the first level cache, thereby providing performance gains. For instance, the second level cache might store larger blocks of data than are provided to the first level cache, or may store blocks adjacent to the requested blocks, or may store blocks from other areas of the disk array that might be likely accessed. The control functions have been described generally herein, yet the skilled artisan will realize that the functionality of such controllers may in fact be partitioned amongst several different controllers. The skilled artisan will also realize that the caches generally described herein may be implemented in a variety of ways, including for example as direct mapped, set associative, or skewed associative caches. In addition, the invention is equally applicable to write-allocate, no-write-allocate, write-through and write-back caching architectures, as well as other caching architectures. The invention as herein described employs caches in two different systems, but it will be clear to the skilled artisan that the invention could be employed within a single system or even upon a single integrated circuit. The control functions may be employed in hardware or in software, or in a combination of the two. The invention is also applicable in multi-level caching schemes including more than two caches. Thus, such modifications are intended to fall within the scope of the following appended claims. Accordingly, the claims set forth below should be construed in view of the full breadth and spirit of the present invention as disclosed herein.

I claim:

1. Apparatus for storing data comprising:
    a first cache for storing data;
    a second cache for storing data;
    wherein the second cache is capable of operating in a first mode wherein data read for storage in the first cache is also stored in entries in the second cache, and is capable of operating in a second mode wherein the data stored in the same entries in the second cache includes data that has been removed from the first cache.

2. The apparatus of claim 1 wherein the first cache resides in a computer system and wherein the second cache resides in a storage system.

3. Apparatus for storing data comprising:
    a first system comprising a first controller and a first cache for storing data;
    a second system comprising a data storage apparatus, a second controller, and a second cache for storing data;
    wherein the first controller is capable of causing clean data to be removed from the first cache and issuing a first command to the second controller indicating that the removed data should be stored in the second cache; and
    wherein the second controller is responsive to the first command to cause the removed data to be stored in the second cache.

4. The apparatus of claim 3 wherein the first command includes the removed data.

5. The apparatus of claim 3 wherein the first command includes the address of the removed data, and wherein the second controller causes the removed data to be stored in the second cache by causing the contents of the data storage apparatus at the address included in the first command to be read and then stored in the second cache.

6. The apparatus of claim 3 wherein the first controller is also operable to issue read request commands to the second controller, and wherein the first controller is operable to issue a second command to the second controller indicating that the second controller should not cause data to be stored in the second cache in response to the read request commands.

7. Apparatus for storing data comprising:
    a first cache for storing data, the first cache being in communication with a second cache, the first cache being capable of operating in a first mode wherein the data read for storage in the second cache is also stored in entries in the first cache, and is capable of operating in a second mode wherein the data stored in the same entries in the first cache includes data that has been removed from the second cache.

8. The apparatus of claim 7 wherein the first cache resides in a storage system and is coupled to a disk array, and wherein the storage system is coupled to the second cache.

9. Apparatus for storing data comprising:
    a first system comprising a data storage apparatus, a first controller and a first cache for storing data, the first system being capable of communication with a second system comprising a second controller and a second cache for storing data;
    wherein the second controller is capable of causing clean data to be removed from the second cache during an attempt to read data, and is capable of issuing a first commend to the first controller indicating that the removed data should be stored in the first cache;
    wherein the first controller is capable of responding to the first command to cause the removed data to be stored in the first cache.

10. The apparatus of claim 9 wherein the first command includes the removed data.

11. The apparatus of claim 9 wherein the first command includes the address of the removed data, and wherein the first controller is capable of causing the removed data to be stored in the first cache by causing the contents of the data storage apparatus at the address included in the first command to be read and then stored in the first cache.

12. The apparatus of claim 9 wherein the first controller is capable of responding to read request commands issued by the second controller, and wherein the first controller is capable of responding to a second command issued by the second controller indicating that the first controller should not cause data to be stored in the second cache in response to the read request commands.

13. A method for storing data comprising:
    storing data in a first cache;
    storing data in a second cache, the second cache operating in either a first mode wherein the data read for storage in the first cache is also stored in entries in the second cache, or in a second mode wherein the data stored in the same entries in the second cache includes data that has been removed from the first cache.

14. The method of claim 13 wherein the step of storing data in a first cache includes the step of storing data in a first cache that resides in a computer system, and wherein the step of storing data in a second cache includes the step of storing data in a second cache that resides in a storage system.

15. A method for storing data comprising:

providing a first system comprising a first controller and a first cache for storing data;

providing a second system comprising a data storage apparatus, a second controller, and second cache for storing data;

removing clean data from the first cache and issuing a first command from the first controller indicating that the removed data should be stored in the second cache;

causing the removed data to be stored in the second cache in response to the first command.

16. The method of claim 15 wherein the step of removing data comprises issuing a first command including the removed data.

17. The method of claim 15 wherein the step of removing data comprises issuing a first command that includes the address of the removed data, and wherein the step of causing the removed data to be stored in the second cache causes the contents of the data storage apparatus at the address included in the first command to be read and then stored in the second cache.

18. The method of claim 15 further including the steps of:

issuing read request commands from the first controller to the second controller;

issuing a second command to the second controller indicating that the second controller should not cause data to be stored in the second cache in response to the read request commands.

19. A method for storing data comprising:

providing a first system comprising a first controller, a data storage apparatus, and a first cache for storing data, the first system being capable of communication with a second system comprising a second controller and second cache for storing data;

responding by the first controller to a command issued by the second controller indicating that clean data removed from the second cache should be stored in the first cache by storing the removed data in the first cache.

20. The method of claim 19 wherein the step of responding comprises responding by the first controller to a command that includes the removed data.

21. The method of claim 19 wherein the step of responding comprises responding to a command that includes the address of the removed data, and wherein the first controller causes the contents of the data storage apparatus at the address included in the command to be read and then stored in the first cache.

22. The method of claim 19 further including the steps of:

responding by the first controller to a second command issued by the second controller indicating that the first controller should not cause data to be stored in the first cache in response to read request commands issued by the second controller, by not storing data in the first cache in response to the read request commands.

23. Apparatus for storing data comprising:

a first cache for storing data;

a second cache smaller than the first cache for storing data;

wherein the second cache is capable of operating a first mode wherein data read for storage in the first cache is also stored in entries in the second cache, and is capable of operating in a second mode wherein the data stored in the same entries in the second cache includes data that has been removed from the first cache.

24. The apparatus of claim 1 wherein the data stored in the second cache includes data that has been removed from the first cache.

* * * * *